No. 854,600. PATENTED MAY 21, 1907.
M. PEDERSEN.
GEARING FOR MOTOR VEHICLES, &c.
APPLICATION FILED MAR. 15, 1906.
8 SHEETS—SHEET 1.
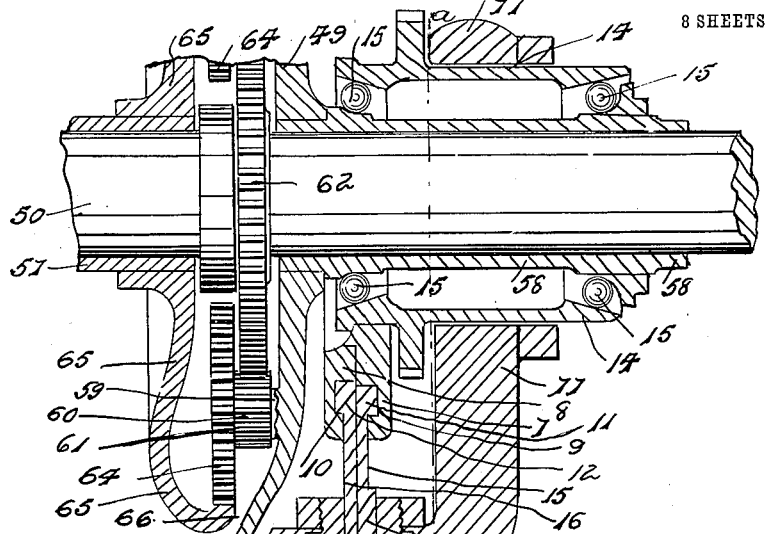
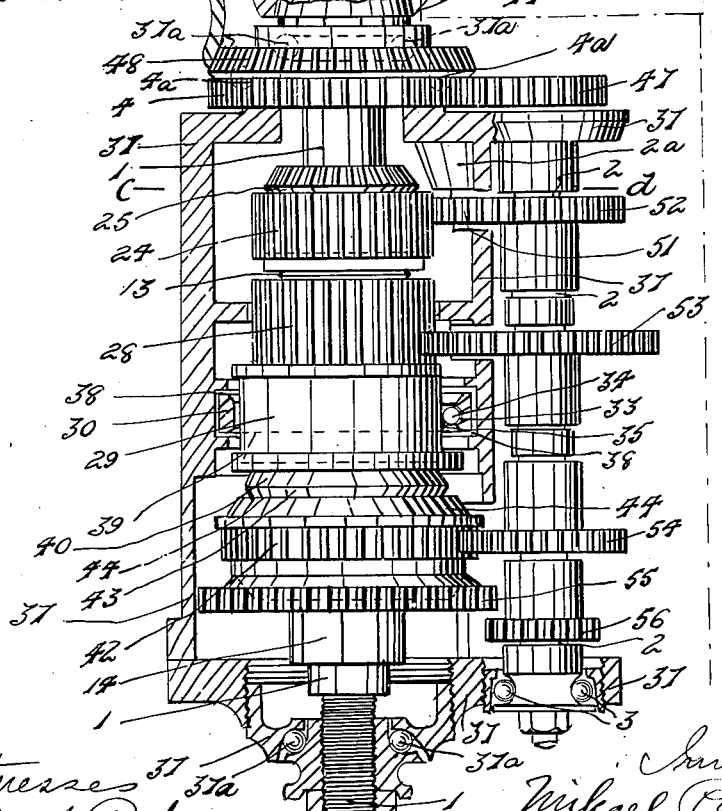
FIG. 1.
Witnesses
Albert Popkema
Wm J. Whalley
Inventor
Mikael Pedersen
By Charles H Riches
Attorney.

No. 854,600.

M. PEDERSEN.
GEARING FOR MOTOR VEHICLES, &c.
APPLICATION FILED MAR. 15, 1906.

PATENTED MAY 21, 1907.

8 SHEETS—SHEET 3.

Witnesses
Albert Popkins
Wm. J. Whalley

Inventor
Mikael Pedersen
By Charles H. Riches
Attorney.

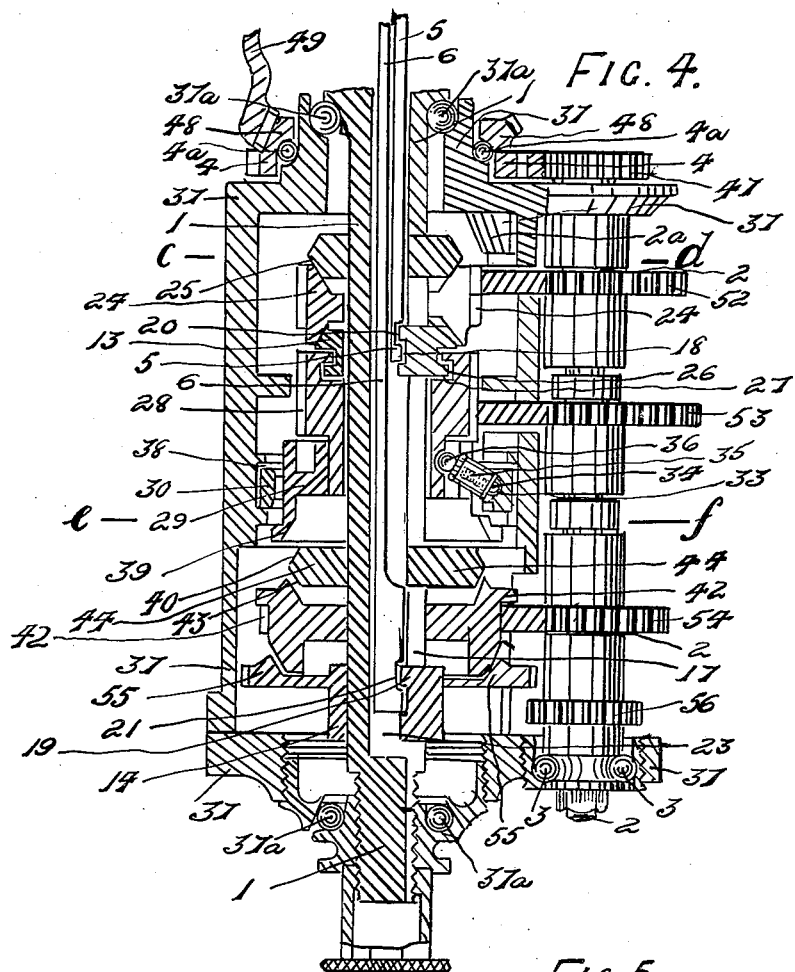

No. 854,600. PATENTED MAY 21, 1907.
M. PEDERSEN.
GEARING FOR MOTOR VEHICLES, &c.
APPLICATION FILED MAR. 15, 1906.

8 SHEETS—SHEET 6.

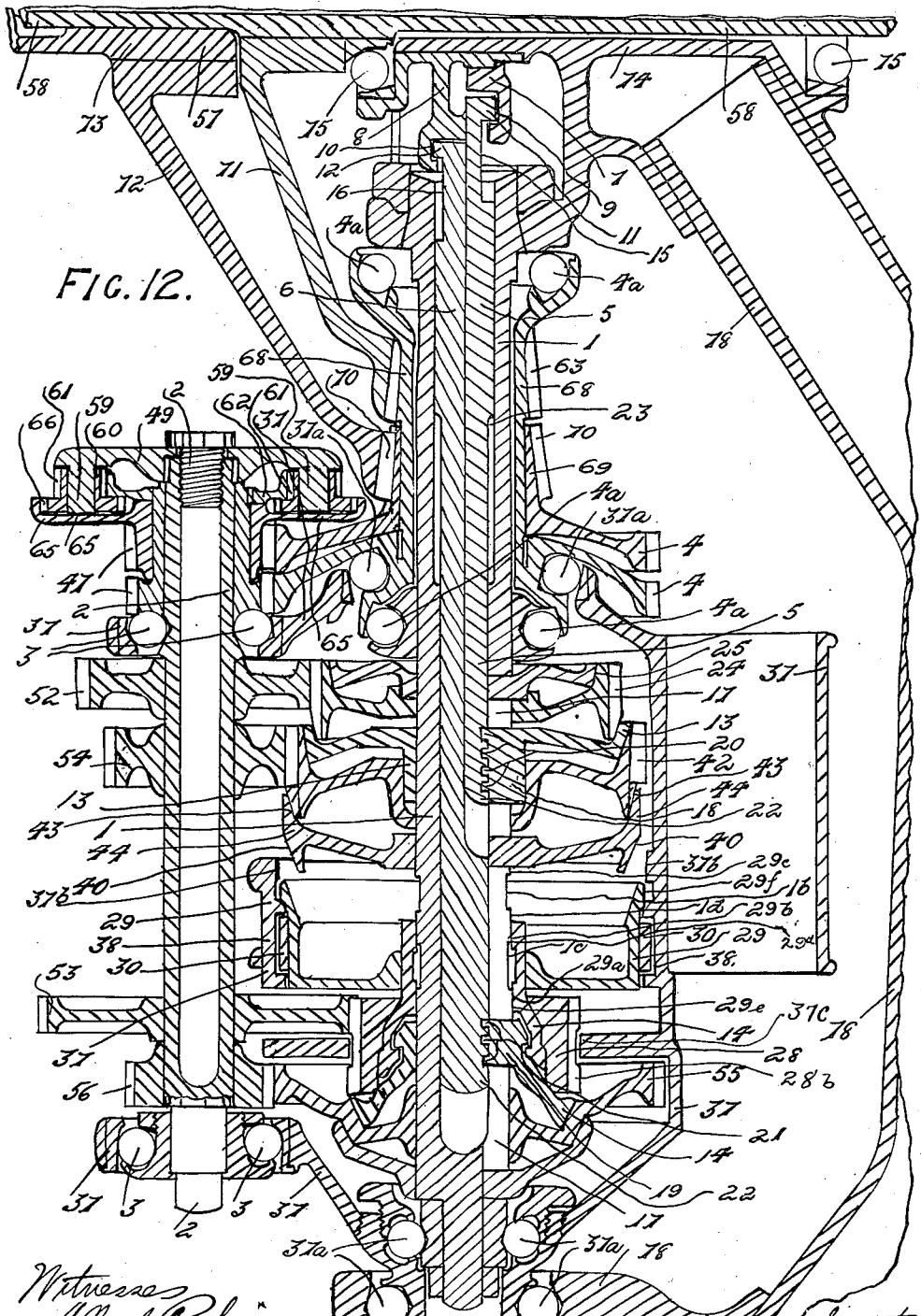

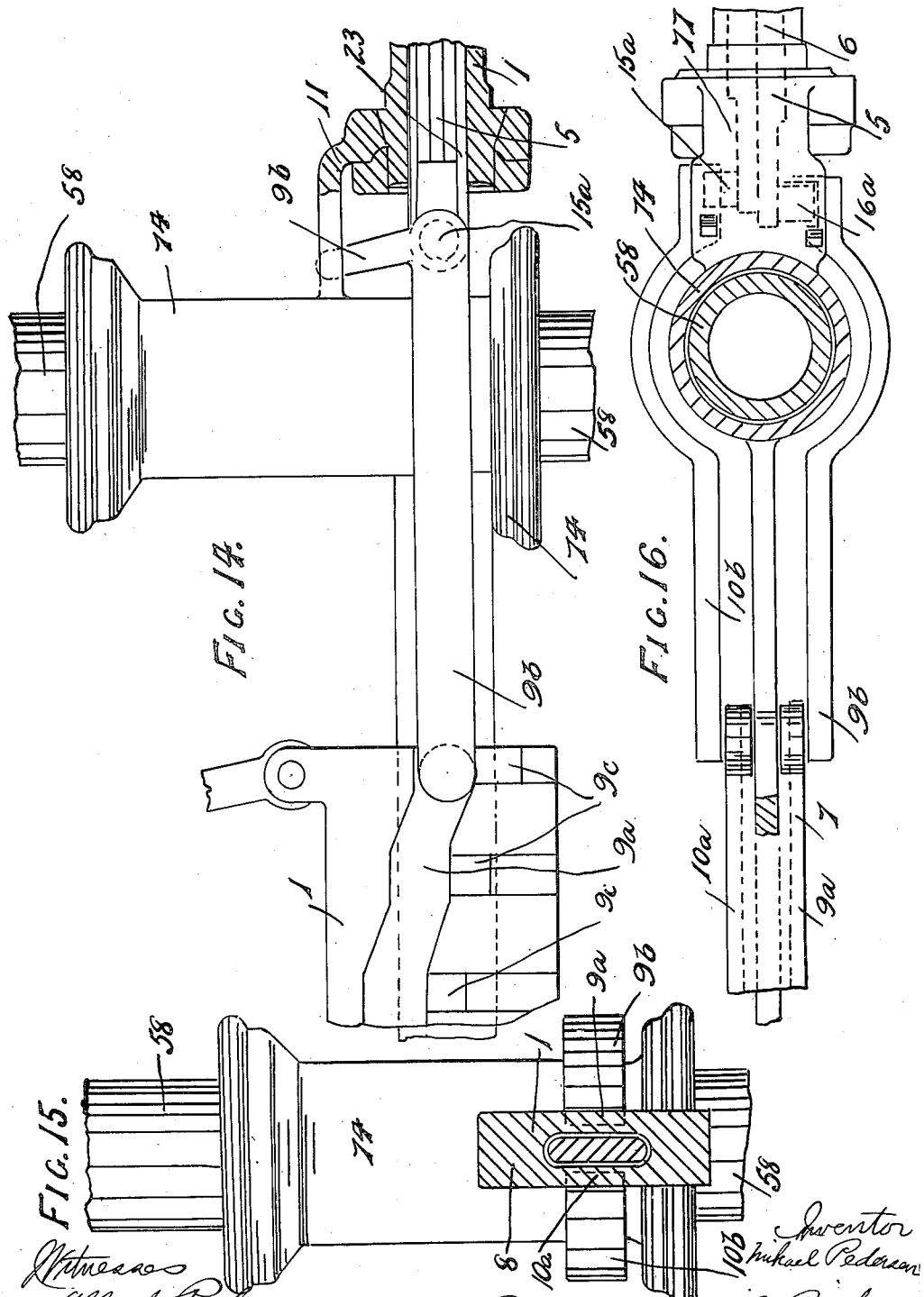

UNITED STATES PATENT OFFICE.

MIKAEL PEDERSEN, OF DURSLEY, ENGLAND.

GEARING FOR MOTOR-VEHICLES, &c.

No. 854,600.

Specification of Letters Patent.

Patented May 21, 1907.

Application filed March 15, 1906. Serial No. 306,231.

*To all whom it may concern:*

Be it known that I, MIKAEL PEDERSEN, a subject of the King of Great Britain, and a resident of Raglan House, Dursley, in the county of Gloucester, England, engineer, have invented a new and useful Gearing for Motor-Vehicles, Motors, Intermediate Motions, and other Mechanical Purposes, of which the following is a specification.

This invention has reference to that form of gearing in which the whole mechanism revolves upon a stationary spindle to which spur-wheels can be locked so as to gear into spur wheels locked to loosely mounted planet spindles from which the motion is transmitted through the medium of a pinion to a main spur wheel, the object of the present improvements being to so arrange such gearing as to enable the operator to change speeds by locking any of the spur wheels to the metal stationary spindle by friction clutches in a particular and improved manner, and also by locking one of the spur wheels to the shell or frame so as to have a direct drive and also, as for instance in motor cars to transmit the power from such gearing to the wheels through a balance or differential gear as hereinafter described. Such an arrangement may be applied to motor vehicles, motors, intermediate motions and other mechanical purposes.

In order that this invention may be clearly understood and more easily carried into practice, I have appended hereunto eight sheets of drawings upon which I have illustrated the nature of my said improvements.

Figure 2:
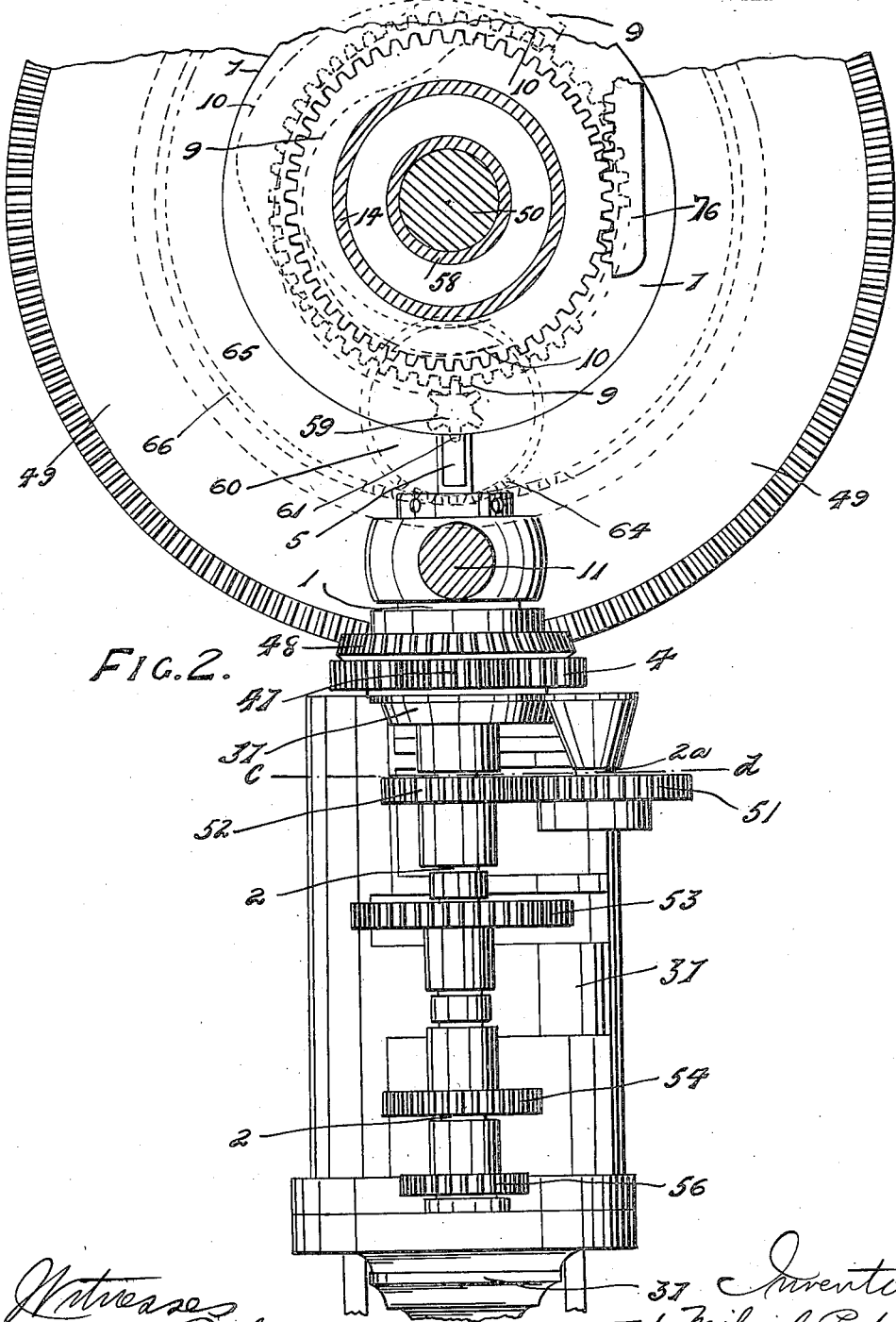
Figure 6:
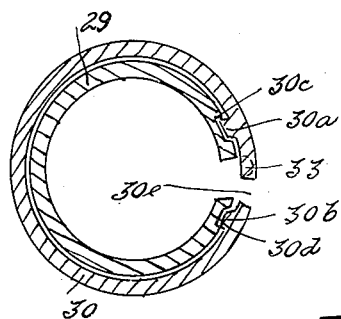
Figure 7:
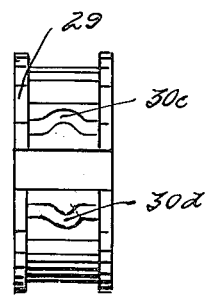
Figure 3:
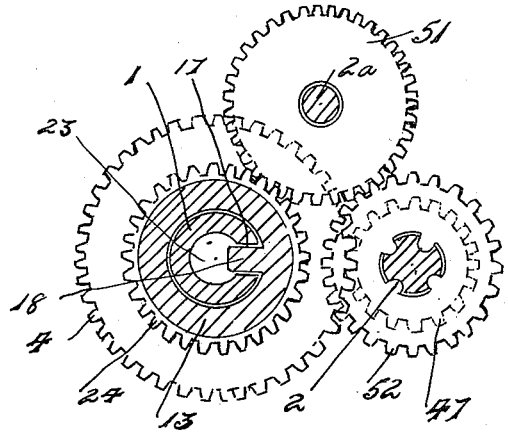
Figure 13:
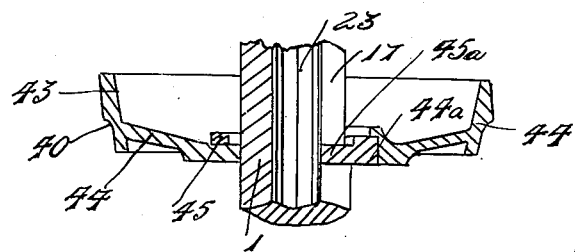
Figure 8:
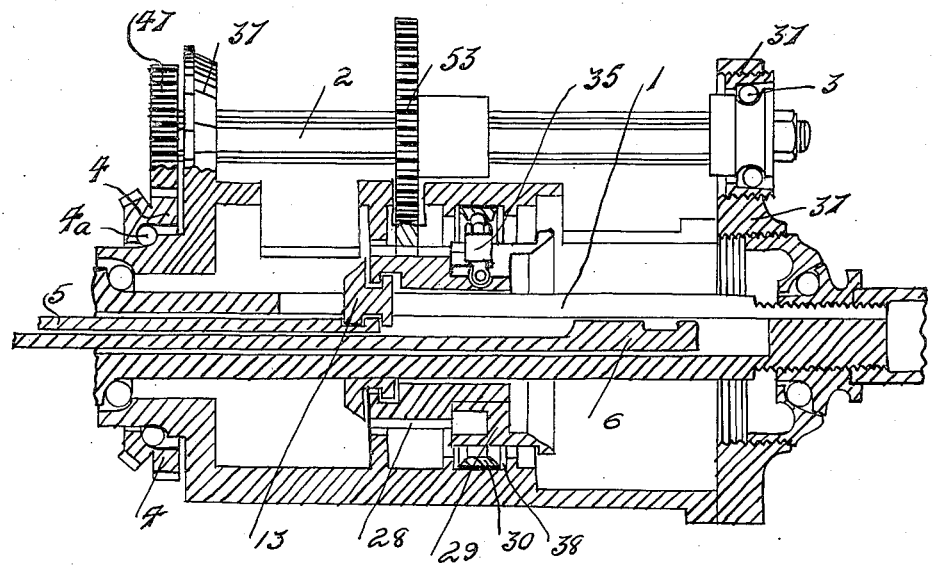
Figure 10:
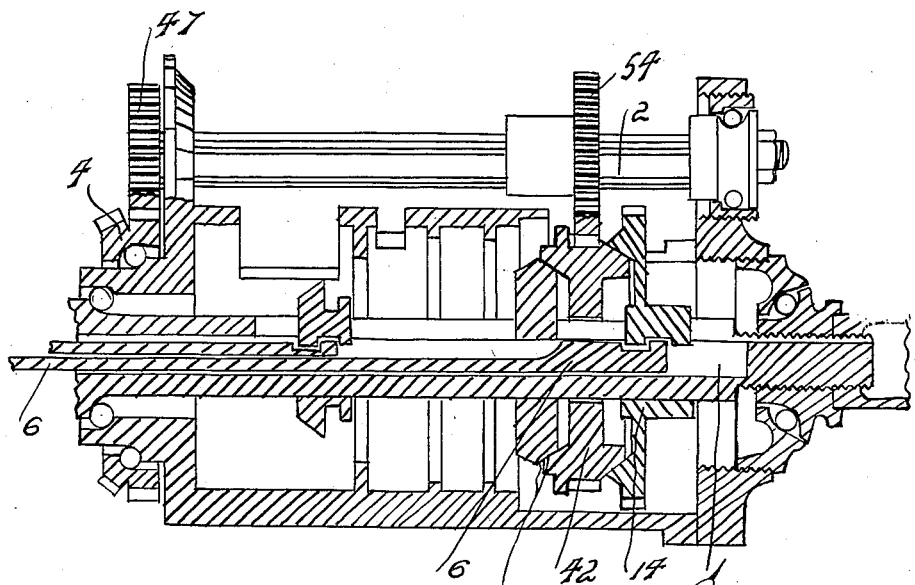
Figure 9:
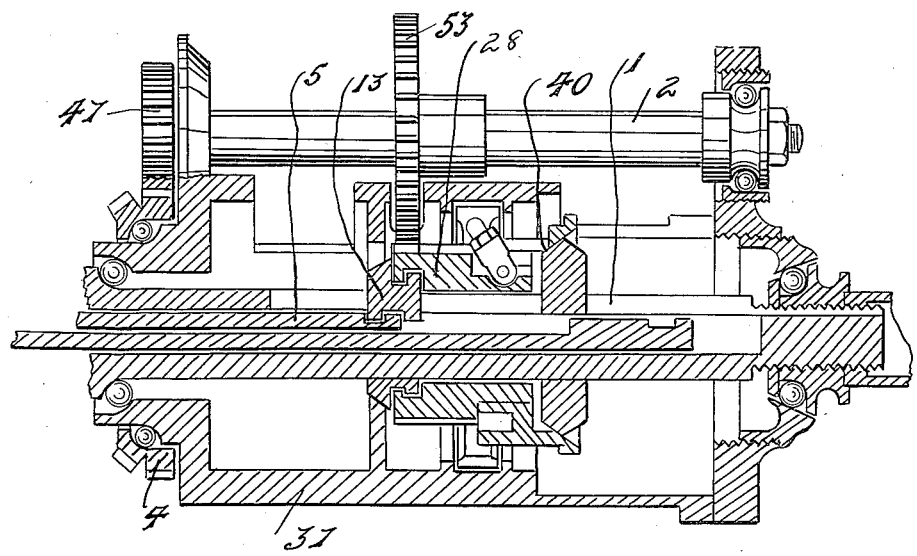
Figure 11:
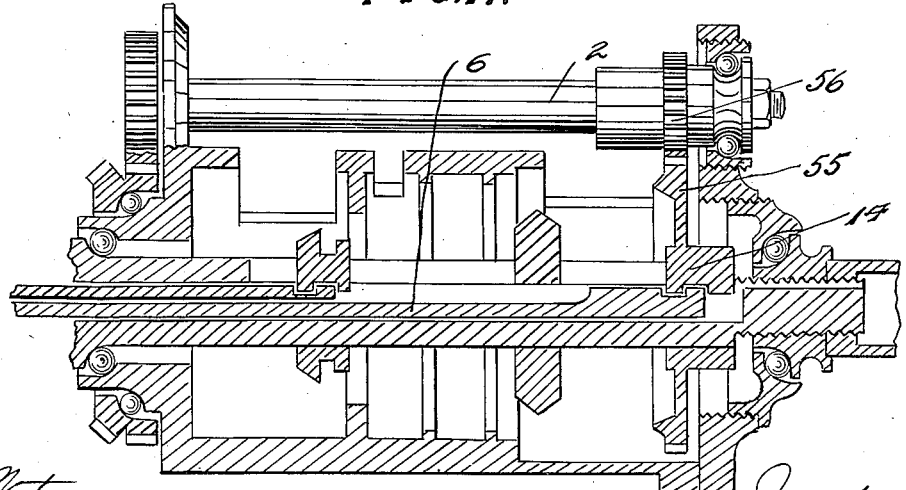

Figure 1 is a part sectional plan of the gearings and balance gear. Fig. 2 is a part sectional elevation on line *a. b.* of Fig. 1. Fig. 3 is a section on line *c. d.* of Fig. 1. Fig. 4 is a part sectional plan of the gearing when geared up for highest speed. Fig. 5 is a section on line *e. f.* of Fig. 4. Fig. 6 is a sectional end elevation of the ring and sleeve. Fig. 7 is a side elevation of the ring. Fig. 8 is a diagram showing the parts geared up for the second highest speed, parts not in use in this individual gear being omitted from the drawings. Fig. 9 is a similar diagram to Fig. 8 only showing the parts used geared up for the third speed. Fig. 10 shows the lowest speed gearing mechanism in the same manner. Fig. 11 illustrates the arrangement by which a reverse is effected. Fig. 12 is a sectional plan of the arrangement showing several modifications including the method of transmitting the power from the balance gear to the car wheel axles. Fig. 13 is a section of the friction shoulder for the combined drive and spur wheel. Fig. 14 is a front elevation showing the application of sliding cams for the actuation of the clutch adjustment rods. Fig. 15 is a sectional side elevation of Fig. 14. Fig. 16 is a sectional plan of Fig. 14.

Like reference numerals refer to like parts throughout the specification and drawings.

In carrying this invention into effect and referring to Fig. 1 of the drawings the gearing mechanism is mounted upon the stationary spindle 1 and consists essentially of a series of spur wheels certain of which are carried by one or more planet spindles 2 and are provided to engage with spur wheels on the stationary spindle 1. The different speeds are obtained by locking certain of the spur wheels to the stationary spindle 1, in such a manner that they engage with other spur wheels fixed on the planet spindle or spindles 2 which revolve on bearings 3. The power is then transmitted from the planet spindle 2 to the main spur wheel 4 which is mounted independently upon bearings 4ª on the stationary spindle 1 and also as for instance in motor cars from thence through the medium of the balance or differential gear to the car wheel axles.

The different wheels are locked to the central stationary spindle 1 by the longitudinal movement of rods 5, 6, which are actuated by the revolving or sliding cams 7, 8 and operate the friction clutches 13, 14 which will slide but not revolve on the stationary spindle 1.

The cams 7, 8 are in the form of slots 9, 10 and in order that the lateral movements of the rods 7, 8 may be regulated they are fitted with adjustable blocks 9ᶜ see Fig. 14 against which the projections 11, 12 of the rods 5. 6. bear. These blocks form the part of the cams where the actual locking takes place.

In the modification shown in Fig. 16 lever actuated sliding cams 9ª, 10ª are used instead of the aforementioned revolving cams, these actuate the rods 5, 6, through the medium of levers 9ᵇ, 10ᵇ, when a longitudinal movement is imparted to them.

Referring back to Fig. 1, the rods 5, 6, of which one, two or more may be used are formed flat at 15, 16 where they carry the projections 11, 12 for the cam slots 9, 10, so that a double cam 7, 8, may in sliding over these flat portions 15, 16 or projections 15ª, 16ª in the case of the sliding cams shown in Figs. 14—16 prevent them twisting, the same principle being brought into play when sliding cams are used. When the rods 5, 6, pass through the hollow spindle 1 Fig. 1 they are connected to the sliding clutches or spur wheels 13, 14 through the slot 17 in the spindle 1, each clutch or wheel 13, 14 having an inward projection 18, 19 engaging preferably in one or more cross slots 20, 21 in the rod, provision being made for the projection 22 on the rod to pass, the locking being effected by twisting the rods so that the projections 18, 19 on the clutch or wheel 13, 14 engage with the cross slots 20, 21 in the rods 5. 6.

Two rods 5, 6, may be effectively provided to pass through the hollow 23 of the stationary spindle 1 in such a manner that they slide on one another. One rod 5 can give three different speeds by operating a sliding clutch which will lock one loosely mounted spur wheel 24 against a shoulder or friction face 25 when moved one way. This clutch forms shoulders at 26 and 27 for another loosely mounted spur wheel 28 which carries a drum or cylinder 29 see Figs. 6 and 7 on which a ring 30 of which a part 30ᵉ is cut away and can slide laterally, but is prevented from turning by a projection 31 in the ring 30 engaging in a groove 32 of the drum 29. This ring has inwardly a seat 33 for the outer end 34 of a longitudinally adjustable toggle 35, the inner end 36 of said toggle 35 being seated in the drum 29. The shell or frame 37 which is mounted on the stationary shaft 1 on the bearings 37ª Fig. 1 has an annular seat or groove 38 for the ring 30 allowing it to turn freely when not expanded. The toggle 35 will however when at right angles to the spindle 1 expand the ring 30, thus creating a friction which will lock the drum 29 and consequently the spur wheel 28 to the shell 37 and thereby give a direct drive.

In order that the ring 30 shall not engage with the shell due to centrifugal force or the like when the drum 29 is in either of the two end positions, it may be provided with jaws 30ª 30ᵇ which slide in slots 30ᶜ 30ᵈ and hold it against the drum 29 when the latter is in the two end positions but which slots or grooves 30ᶜ 30ᵈ are curved to allow of the expansion of the ring 30 when the sleeve 29 is in the middle position, see Figs. 6 and 7.

The drum or wheel 29 also has a friction face 39 so that by being pressed against another shoulder or friction face 40 on the stationary spindle 1 it is locked to the spindle 1 thereby giving a third speed.

With reference to Fig. 12 it may be seen that side strain is prevented on the stationary spindle 1 due to the fact that this combined spur wheel and drum seatings 28 and 29 is bearing on the spindle at 29ª, 29ᵇ, or 29ᵇ, 29ᶜ when in the two extreme positions but bears on the shell at 37ᵇ and 37ᶜ when in the middle position. For this purpose the seating on the spindle is reduced at 1ᵇ and 1ᶜ so as to leave an annular bearing face 1ᵈ which bears upon the raised bearing parts 29ᵈ and 29ᵉ of the spur wheels and drum seatings 28 and 29 in turn bear when in the two extreme positions, but are opposite the annular recesses 1ᵇ, 1ᶜ, in the spindle 1 when in the middle position. Projections 37ᵇ and 37ᶜ inward in the shell 37 bear on the seating 29ᶠ and 28ᵇ, of the combined drum and wheel when in the middle position. A sliding friction clutch operated by the second rod 6 Fig. 1 will lock another spur wheel 42 against a shoulder or friction face 43 which is facing the opposite way to the last named shoulder or face 40 and may be made in one piece 44. This shoulder 44 is screwed into its position, on the spindle 1 as shown in Fig. 13 to enable it to take the end thrust. To prevent it from twisting a key 45 fits into a recess 44ª in the shoulder 44 and engages in the slot 17 in the spindle 1 and may be kept in position by the rod 6, an inward projection 45ª on the shoulder being arranged for the purpose.

The main spur wheel 4 which is driven from the pinion 47 on the planet spindle 2 may carry a bevel pinion 48 gearing into a bevel wheel 49 on the wheel or intermediate axle 50.

The action of upward gearing providing for four speeds and a reverse is as follows:—

For the highest speed the five spur wheels 24, 51, 52, 47 and 4 shown in Fig. 3 are brought into use. The spur wheel 24 is fixed upon the stationary shaft 1 by the rod 5 which locks it by means of the clutch 13 against the friction face 25 of the shaft. Thus when the shell 37 is revolved about the stationary shaft 1 motion is transmitted by the spur wheel 24 to the planet shaft 2 through the medium of spur wheels 51, mounted on stud 2ª, and 52. The motion is then transmitted from the planet spindle 2 by means of the pinion 47 to the main spur wheel 4.

For the second highest speed the parts shown in Fig. 8 are brought into use. The spur wheel 28 is locked to the shell 37 by means of the toggle actuated ring 30, the locking being operated by means of the rod 5 and clutch 13. This causes the spur wheel to revolve with the shell and consequently locks the planet spindle 2 by the spur wheel 53 which is in engagement with the spur wheel 28. The pinion 47 will also be locked, it being fixed to the planet spindle 2, and being in engagement with the main spur wheel 4 will cause the latter to revolve with the shell. Hence in the second highest gear the main spur wheel 4 is locked to the shell 37 through the engagement of ring 30, toggle 35, spur wheel 28, spur wheel 53, planet spindle 2, and pinion 47.

For the third speed the parts shown in Fig. 9 are in use. The spur wheel 28 is locked to the stationary spindle 1 by the action of the rod 5 and clutch 13 which hold it against the shaft friction face 40. On the shell 37 being revolved the spur wheel 28 engages with the spur wheel 53 on the planet spindle 2 and this motion is transmitted through the planet spindle 2 and pinion 47 to the main spur wheel 4.

For the lowest speed the parts shown in Fig. 10 are in engagement.

The spur wheel 42 is locked to the stationary spindle 1 by the action of the rod 6 and clutch 14 which hold it against the shaft friction face 43. On the revolution of the shell the planet spindle 2 transmits the motion by means of spur wheel 54 which engages with spur wheel 42 and pinion 47 to the main spur wheel, 4.

The principle upon which the reverse is based is exactly the same as that upon which the gears work, it being simply a repetition of the gearing mechanism only in such a manner that a gear of less than 0% is obtained, thereby causing the main spur wheel to rotate in the reverse direction to the shell. The parts in use are shown in Fig. 11. The spur wheel 55 which is integral with the clutch 14 is brought into engagement with the spur wheel 56 on the planet spindle 2 by the longitudinal movement of the rod 6. Motion is transmitted to the planet spindle 2 as in the former cases the spur wheel 55 being keyed to the stationary spindle by a projection which extends into the shaft slot and only allows of its longitudinal movement.

In the modification shown in Fig. 12 the spur wheel 55 is loose on the stationary spindle 1 and in the reverse it is locked to the shaft friction face 19 by rod 6 and clutch 14. This method is an improvement on the other inasmuch as the spur wheel 55 is always in engagement with the spur wheel 56 and is brought in and out of engagement with the stationary spindle 1 instead of in and out of engagement with the spur wheel 56. By this means the planet spindle is rotated and the motion conveyed to the main spur wheel 4 by the pinion 47.

The motion is transmitted from the main spur wheel 4 to the car or sprocket wheel axles 57, 58 as before stated through the medium of the bevel wheel 49. This bevel wheel 49 being loosely mounted may have studs 59 on each of which is mounted a double spur wheel 60 the smallest diameter 61 of which is in engagement with a spur wheel 62 on the axle 58 see Fig. 2 for one car wheel or sprocket chain wheel and the largest diameter 64 engaging a wheel 65 with internal teeth 66 on the axle 57 for the other car or sprocket wheel.

In the modification shown in Fig. 12 provision is made for gearing down instead of up, and the main spur wheel 4 has a sleeve 68 on the stationary spindle 1 driven from the balance gear 49, 65 which also drives a second sleeve 69 mounted on first named sleeve 68 which carries the bevel pinion 70 driving the bevel wheel 72 on the one car wheel axle 57 and also drives the other sleeve 68 carrying the bevel pinion 63 driving the bevel wheel 71 on the other car wheel axle 58 the balance gear 49, 65 in this case being mounted upon the planet spindle 2.

The bevel wheel 72 may be fixed on one end of a sleeve 73 loosely mounted on one axle 58 carried in the hollow of the axle 57 for the other side. On the sleeve 58 may be mounted another sleeve 74 which may run on bearings 75 and on this sleeve 74 may be mounted the cams 7, 8, which may be operated by a lever or toothed rack 76 and this sleeve 74 may also carry an arm 77 in which the stationary spindle is fixed. Extra support may be obtained by the use of the stay 78 which is provided to form a bearing for the outer end of the shell 37.

The compensating mechanism shown in Fig. 12 is the same as that above described with reference to Fig. 2.

What I claim as my invention, and desire to secure by Letters Patent is:—

1. A gearing for motor vehicles, motors and intermediate motions, and other mechanical purposes, consisting of a stationary spindle, a set of spur wheels loosely mounted thereon, a hub shell, a planet spindle carried by the hub shell, a set of spur wheels mounted on the planet spindle and meshing with their respective spur wheels on the stationary spindle, and means for selectively locking the spur wheels to the stationary spindle to vary the speed of the revolution of the planet spindle and shell.

2. A gearing for motor vehicles, motors and intermediate motions, and other mechanical purposes, consisting of a stationary spindle, a set of spur wheels loosely mounted thereon, a hub shell, a planet spindle carried by the hub shell, a set of spur wheels mounted on the planet spindle and meshing with their respective spur wheels on the stationary spindle, friction clutches for locking the spur wheels to the stationary spindle and means to selectively actuate the friction clutches to lock their respective spur wheels to the stationary spindle to vary the speed of the revolution of the planet spindle and hub shell.

3. A gearing for motor vehicles, motors and intermediate motions, and other mechanical purposes, consisting of a stationary spindle, a set of spur wheels loosely mounted thereon, a hub shell, a planet spindle carried thereby, a set of spur wheels mounted on the planet spindle to mesh with their respective spur wheels on the stationary spindle friction clutches for locking the spur wheels to the stationary spindle, longitudinally adjustable rods, cams to actuate the longitudinally adjustable rods and adjustable blocks to regulate the lateral movements of said rods.

4. A gearing for motor vehicles, motors and intermediate motions, and other mechanical purposes, consisting of a stationary spindle, a set of spur wheels loosely mounted thereon, a hub shell, a planet spindle carried by the hub shell, a set of spur wheels mounted on the planet spindle and meshing with their respective spur wheels on the stationary spindle, means for selectively locking the spur wheels to the stationary spindle to vary the speed of the revolution of the planet spindle and shell, a spur wheel carried by the stationary spindle, an expansible ring to lock the last mentioned spur wheel to the hub shell, and a toggle to expand said ring.

5. A gearing for motor vehicles, motors and intermediate motions, and other mechanical purposes, consisting of a stationary spindle, a set of spur wheels loosely mounted thereon, a hub shell, a planet spindle carried by the hub shell, a set of spur wheels mounted on the planet spindle and meshing with their respective spur wheels on the stationary spindle, friction clutches for locking the spur wheels to the stationary spindle, means to selectively actuate the friction clutches to lock their respective spur wheels to the stationary spindle to vary the speed of the revolution of the planet spindle and hub shell, a spur wheel carried by the stationary spindle, an expansible ring to lock the last mentioned spur wheel to the hub shell and a toggle to expand said ring.

6. A gearing for motor vehicles, motors and intermediate motions, and other mechanical purposes, consisting of a stationary spindle, a set of spur wheels loosely mounted thereon, a hub shell, a planet spindle carried thereby a set of spur wheels mounted on the planet spindle to mesh with their respective spur wheels on the stationary spindle friction clutches for locking the spur wheels to the stationary spindle, longitudinally adjustable rods, cams to actuate the longitudinally adjustable rods, adjustable blocks to regulate the lateral movements of said rods, a spur wheel carried by the stationary spindle, an expansible ring to lock the last mentioned spur wheel to the hub shell and a toggle to expand said ring.

7. A gearing for motor vehicles, motors and intermediate motions, and other mechanical purposes, consisting of a stationary spindle, a set of spur wheels loosely mounted thereon, a hub shell, a planet spindle carried by the hub shell, a set of spur wheels mounted on the planet spindle and meshing with their respective spur wheels on the stationary spindle, and means for selectively locking the spur wheels to the stationary spindle to vary the speed of the revolution of the planet spindle and shell, a main spur wheel on the stationary spindle, a spur wheel on the planet spindle meshing therewith, two driven shafts, a bevel wheel driven from the last mentioned spur wheel on the stationary shaft, two studs carried by the bevel wheel, a double spur wheel of different diameters mounted on each stud, a spur wheel on each of the driven shafts one of which meshes with the smaller diametered ones of said double spur wheels, and the other with the larger diametered ones of said double spur wheels.

8. A gearing for motor vehicles, motors and intermediate motions, and other mechanical purposes, consisting of a stationary spindle, a set of spur wheels loosely mounted thereon, a hub shell, a planet spindle carried by the hub shell, a set of spur wheels mounted on the planet spindle and meshing with their respective spur wheels on the stationary spindle, friction clutches for locking the spur wheels to the stationary spindle and means to selectively actuate the friction clutches to lock their respective spur wheels to the stationary spindle to vary the speed of the revolution of the planet spindle and hub shell, a main spur wheel on the stationary spindle, a spur wheel on the planet spindle meshing therewith, two driven shafts, a bevel wheel driven from the last mentioned spur wheel on the stationary shaft, two studs carried by the bevel wheel, a double spur wheel of different diameters mounted on each stud, a spur wheel on each of the driven shafts one of which meshes with the smaller diametered ones of said double spur wheels, and the other with the larger diametered ones of said double spur wheels.

9. A gearing for motor vehicles, motors and intermediate motions, and other mechanical purposes, consisting of a stationary spindle, a set of spur wheels loosely mounted thereon, a hub shell, a planet spindle carried thereby, a set of spur wheels mounted on the planet spindle to mesh with their respective spur wheels on the stationary spindle, friction clutches for locking the spur wheels to the stationary spindle, longitudinally adjustable rods, cams to actuate the longitudinally adjustable rods, adjustable blocks to regulate the lateral movements of said rods, a main spur wheel on the stationary spindle, a spur wheel on the planet spindle meshing therewith, two driven shafts, a bevel wheel driven from the last mentioned spur wheel on the stationary shaft, two studs carried by the bevel wheel, a double spur wheel of different diameters mounted on each stud, a spur wheel on each of the driven shafts one of which meshes with the smaller diametered ones of said double spur wheels, and the other with the larger diametered ones of said double spur wheels.

10. A gearing for motor vehicles, motors and intermediate motions, and other mechanical purposes, consisting of a stationary spindle, a set of spur wheels loosely mounted thereon, a hub shell, a planet spindle carried by the hub shell, a set of spur wheels mounted on the planet spindle and meshing with their respective spur wheels on the stationary spindle, means for selectively locking the spur wheels to the stationary spindle to vary the speed of the revolution of the planet spindle and shell, a spur wheel carried by the stationary spindle, an expansible ring to lock the last mentioned spur wheel to the hub shell, a toggle to expand said ring, a main spur wheel on the stationary spindle, a spur wheel on the planet spindle meshing therewith, two driven shafts, a bevel wheel driven from the last mentioned spur wheel on the stationary shaft two studs carried by the bevel wheel, a double spur wheel of different diameters mounted on each stud, a spur wheel on each of the driven shafts, one of which meshes with the smaller diametered ones of said double spur wheels, and the other with the larger diametered ones of said double spur wheels.

11. A gearing for motor vehicles, motors and intermediate motions, and other mechanical purposes, consisting of a stationary spindle, a set of spur wheels loosely mounted thereon, a hub shell, a planet spindle carried by the hub shell, a set of spur wheels mounted on the planet spindle and meshing with their respective spur wheels on the stationary spindle, friction clutches for locking the spur wheels to the stationary spindle, means to selectively actuate the friction clutches to lock their respective spur wheels to the stationary spindle to vary the speed of the revolution of the planet spindle and hub shell, a spur wheel carried by the stationary spindle, an expansible ring to lock the last mentioned spur wheel to the hub shell, a toggle to expand said ring, a main spur wheel on the stationary spindle, a spur wheel on the planet spindle meshing therewith, two driven shafts, a bevel wheel driven from the last mentioned spur wheel on the stationary shaft, two studs carried by the bevel wheel, a double spur wheel of different diameters mounted on each of said studs, a spur wheel on each of the driven shafts one of which meshes with the smaller diametered ones of said double spur wheels, and the other with the larger diametered ones of said double spur wheels.

12. A gearing for motor vehicles, motors and intermediate motions, and other mechanical purposes, consisting of a stationary spindle, a set of spur wheels loosely mounted thereby, a set of spur wheels mounted on the planet spindle to mesh with their respective spur wheels on the stationary spindle friction clutches for locking the spur wheels to the stationary spindle, longitudinally adjustable rods, cams to actuate the longitudinally adjustable rods, adjustable blocks to regulate the lateral movements of said rods, a spur wheel carried by the stationary spindle, an expansible ring to lock the last mentioned spur wheel to the hub shell a toggle to expand said ring, a main spur wheel on the stationary spindle, a spur wheel on the planet spindle meshing therewith, two driven shafts, a bevel wheel driven from the last mentioned spur wheel on the stationary shaft, two studs carried by the bevel wheel, a double spur wheel of different diameters mounted on each stud, a spur wheel on each of the driven shafts, one of which meshes with the smaller diametered ones of said double spur wheels and the other with the larger diametered ones of said double spur wheels.

In witness whereof I have hereunto set my hand in the presence of two witnesses.

MIKAEL PEDERSEN.

Witnesses:
LEWIS WM. GOOLDS,
WALTER H. E. BARTLAM.